United States Patent
Brandon et al.

(10) Patent No.: US 10,520,389 B2
(45) Date of Patent: Dec. 31, 2019

(54) AERODYNAMIC MODELING USING FLIGHT DATA

(71) Applicant: U.S.A. as represented by the Administrator of the National Aeronautics and Space Administration, Washington, DC (US)

(72) Inventors: Jay Brandon, Poquoson, VA (US); Eugene A. Morelli, Williamsburg, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 1124 days.

(21) Appl. No.: 14/541,732

(22) Filed: Nov. 14, 2014

(65) Prior Publication Data

US 2016/0238481 A1    Aug. 18, 2016

Related U.S. Application Data

(60) Provisional application No. 61/909,467, filed on Nov. 27, 2013.

(51) Int. Cl.
*G01M 9/08* (2006.01)
*G06F 17/50* (2006.01)

(52) U.S. Cl.
CPC ..................... *G01M 9/08* (2013.01)

(58) Field of Classification Search
CPC combination set(s) only.
See application file for complete search history.

(56) References Cited

PUBLICATIONS

Brandon, J.M. and Morelli, E.A. "Nonlinear Aerodynamic Modeling From Flight Data Using Advanced Piloted Maneuvers and Fuzzy Logic," NASA/TM-2012-217778 [online], Oct. 2012 [retrieved on Mar. 2, 2017]. Retrieved from the Internet: <https://nari.arc.nasa.gov/sites/default/files/Brandon_NASA-TM-2012-217778.pdf>.*

Morelli, E.A. "Efficient Global Aerodynamic Modeling from Flight Data," AIAA-2012-1050 [online], 50th AIAA Aerospace Sciences Meeting, Nashville, TN, Jan. 2012 [retrieved on Mar. 2, 2017]. Retrieved from the Internet: <http://arc.aiaa.org | DOI: 10.2514/6.2012-1050>.*

Morelli, E.A. and Smith, M.S. "Real-Time Dynamic Modeling—Data Information Requirements and Flight Test Results," Journal of Aircraft [online], vol. 46, No. 6, pp. 1894-1905, Nov.-Dec. 2009 [retrieved on Mar. 2, 2017]. Retrieved from the Internet: <http://arc.aiaa.org | DOI: 10.2514/1.40764>.*

Morelli, E. A. "Publication List" [online], Feb. 2016 [retrieved on Mar. 2, 2017]. Retrieved from the Internet: <http://www.sunflyte.com/Morelli_Bibliography.pdf>.*

(Continued)

*Primary Examiner* — Bijan Mapar
(74) *Attorney, Agent, or Firm* — Robin W. Edwards

(57) ABSTRACT

Systems and methods are described for development of a nonlinear global aerodynamic model using fuzzy logic modeling as well as multivariate orthogonal function modeling with splines. The systems and methods described herein may be utilized to more quickly develop a global aerodynamic model of an aircraft, allowing for development of a global aerodynamic model of an aircraft in real-time, during a test flight, and reducing time and cost associated with the model development.

20 Claims, 5 Drawing Sheets

(56) References Cited

PUBLICATIONS

Wang, Zhongjun, C. Edward Lan, and Jay M. Brandon. "Fuzzy logic modeling of nonlinear unsteady aerodynamics." AIAA paper 4351 (1998). (Year: 1998).*

Lea, D. (1994). Design patterns for avionics control systems. Doug Lea (Year: 1994).*

Tomczyk, A. (2010). Shaping indirect flight control system properties for general aviation aircraft. Journal of Aerospace Engineering, 24(1), 59-71. (Year: 2010).*

Boguslayskii, I. A., Kruglyakova, O. V., Miroshichev, N. Y., & Tsimbalyuk, G. M. (2009). Algorithm for identifying parameters of the dynamic system of an aircraft. Journal of Computer and Systems Sciences International, 48(3), 333-344. (Year: 2009).*

Klein, Vladislav et al., "Determination of Airplane Model Structure from Flight Data Using Splines and Stepwise Regression," NASA Technical Paper 2126, Mar. 1983, pp. 1-48.

McNally, B. David, "Full-Envelope Aerodynamic Modeling of the Harrier Aircraft," NASA Technical Memorandum 88376, Oct. 1986, pp. 1-14.

Batterson, James G., "Estimation of Airplane Stability and Control Derivatives from Large Amplitude Longitudinal Maneuvers," Scientific and Technical Information Branch, 1981, NASA Technical Memorandum 83185, pp. 1-40.

Batterson, James G., "Partitioning of Flight Data for Aerodynamic Modeling of Aircraft at High Angles of Attack," J. Aircraft, Apr. 1989, pp. 334-339, vol. 26, No. 4.

Lombaerts, T.J.J. et al., "Online Aerodynamic Model Structure Selection and Parameter Estimation for Fault-Tolerant Control," Journal of Guidance, Control, and Dynamics, May-Jun. 2010, pp. 707-723, vol. 33, No. 3.

Visser, C.C. De et al., "Global Aerodynamic Modeling with Multivariate Splines," AIAA Modeling and Simulation Technologies Conference and Exhibit, Aug. 18-21, 2008, pp. 1-19.

Visser, C.C. De et al., "A Multidimensional Spline Based Global Nonlinear Aerodynamic Model for the Cessna Citation II," AIAA Atmospheric Flight Mechanics Conference , Aug. 2-5, 2010, pp. 1-30.

Seher-Weiss, Susanne, "Identification of Nonlinear Aerodynamic Derivatives Using Classical and Extended Local Model Networks," Aerospace Science and Technology, 2011, pp. 33-44, vol. 15.

Hui, Kenneth et al., "Beechjet Flight Test Data Gathering and Level-D Simulator Aerodynamic Mathematical Model Development," AIAA Atmospheric Flight Mechanics Conference, Aug. 6-9, 2001, pp. 1-11.

Garza, Frederico R., "Collection of Nonlinear Aircraft Simulations in MATLAB," Jan. 2003, NASA-TM-2003-212145, pp. 1-75.

Barron, Andrew R., "Predicted Squared Error: A Criterion for Automatic Model Selection," Self-Organizing Methods in Modeling, 1984, pp. 86-103, S.J., Ed., Marcel Dekker, Inc., New York, NY.

Wang, Zhongjun et al., "Fuzzy Logic Modeling of Nonlinear Unsteady Aerodynamics," AIAA, Inc., AIAA-98-4351, Aug. 1998., pp. 565-580.

Morrelli, Eugene A., "Global Nonlinear Aerodynamic Modeling Using Multivariate Orthogonal Functions," Journal of Aircraft, Mar.-Apr. 1995, pp. 270-277, vol. 32, No. 2.

Takagi, Tomohiro et al., "Fuzzy Identification of Systems and Its Applications to Modeling and Control," IEEE Transactions on Systems, Man, and Cybernatics, Jan./Feb. 1985, pp. 116-132, vol. SMC-15, No. 1.

Tan, Jian et al., "Efficient Establishment of a Fuzzy Logic Model for Process Modeling and Control," IEEE Transactions on Semiconductor Manufacturing, Feb. 1995, pp. 50-81, vol. 8, No. 1.

Morelli, Eugene A., "Estimating Noise Characteristics from Flight Test Data Using Optimal Fourier Smoothing," Journal of Aircraft, Jul.-Aug. 1995, pp. 689-695, vol. 32, No. 4.

Morelli, Eugene A., "Practical Aspects of the Equation-Error Method for Aircraft Parameter Estimation," AIAA, AIAA Atmospheric Flight Mechanics Conference, Aug. 21-24, 2006, pp. 1-18.

Morelli, Eugene A., Global Aerodynamic Modeling for Stall/Upset Recovery Training Using Efficient Piloted Flight Test Techniques, AIAA, AIAA Modeling and Simulation Technologies Conference, Aug. 2013, pp. 1-20.

Morelli, Eugene A., "Global Nonlinear Parametric Modeling with Application to F-16 Aerodynamics," ACC Paper WP04-2, Paper ID i-98010-2, American Control Conference, Jun. 1998, pp. 1-6.

Brandon, Jay M. et al., "Nonlinear Aerodynamic Modeling from Flight Data Using Advance Piloted Maneuvers and Fuzzy Logic," NASA/TM-2012-217778, Oct. 2012, pp. 1-20.

Morelli, Eugene .A., "Efficient Global Aerodynamic Modeling from Flight Data," AIAA, 50th AIAA Aerospace Science Meeting, Jan. 2012, pp. 1-26.

Klein, V., et al., "Regression Methods," Aircraft System Identification—Theory and Practice, AIAA Education Series, 2006, pp. 95-97, 115-120, 145-151, 309-312, and 357-366, Reston, VA.

Jategaonkar, R.V., Mönnich, W., Fishenberg, D. and Krag, B. "Identification of C-160 Simulator Data Base from Flight Data," Proceedings of the 10th IFAC Symposium on System Identification, Copenhagen, Denmark, Elsevier Sciences Ltd., Oxford, UK, 1994, pp. 1031-1038.

* cited by examiner

AERODYNAMIC MODELING USING FLIGHT DATA

CROSS-REFERENCE TO RELATED PATENT APPLICATION(S)

This patent application claims the benefit of and priority to U.S. Provisional Patent Application Ser. No. 61/909,467, filed on Nov. 27, 2013, the contents of which are hereby incorporated by reference in their entirety.

STATEMENT REGARDING FEDERALLY SPONSORED RESEARCH OR DEVELOPMENT

This invention described herein was made by employees of the United States Government and may be manufactured and used by or for the Government of the United States for governmental purposes without the payment of any royalties thereon or therefore.

TECHNICAL FIELD OF THE INVENTION

Aspects of this disclosure generally relate to systems and methods for modeling of aerodynamic performance of a vehicle, which may include but is not limited to an aircraft.

BACKGROUND OF THE INVENTION

A global aerodynamic model may describe, as one or more mathematical formulae, the aerodynamic behavior of a vehicle, such as, among others, an airplane or helicopter. As such, a global aerodynamic model may be utilized to analyze flight dynamics, for flight simulation, and/or for development of flight control systems. Typically, global aerodynamic models are built using aerodynamic data collected from wind tunnel tests, or from data generated by computational methods, such as computational fluid dynamics (CFD). However, these techniques can be expensive, time-consuming, and have inherent fidelity limitations. For example, data collected from wind tunnel tests and/or computational fluid dynamics testing may include limitations arising from factors such as, but not limited to, wind-tunnel model scale and geometry differences relative to a full-scale aircraft, wind-tunnel wall and sting interference, wind-tunnel flow angularity, Reynolds number differences, flow modeling deficiencies, and grid geometry approximations for both the aircraft and the flow field. Accordingly, it may be advantageous to use full-scale test flights to collect sensor data, subsequently using this full-scale test flight data to develop aerodynamic models of vehicles, such as aircraft.

NOMENCLATURE

The following is a list of terms, with associated explanations, used throughout this disclosure, with their associated units presented in parentheses.

$A(x)$=membership function value for variable x.

$a_x, a_y, a_z$=body-axis translational accelerometer measurements (g).

b=wing span, (ft).

$\bar{c}$=wing mean aerodynamic chord, (ft).

$C_x, C_y, C_z$=body-axis nondimensional aerodynamic force coefficients.

$C_l, C_m, C_n$=body-axis nondimensional aerodynamic moment coefficients for rolling, pitching, and yawing moment.

g=gravitational acceleration, (32.174 ft/sec^2).

$I_x, I_y, I_z, I_{xz}$=mass moments of inertia, (slug-ft^2).

m=aircraft mass, (slug).

M=Mach number.

$M_T$=body-axis pitching moment from engine thrust, (ft-lbf).

$N_S$=Model search stage number.

p=coefficient of membership function

P=value of membership function.

p,q,r=body-axis roll, pitch, and yaw rates, (rad/s or deg/s).

$\hat{p}$=nondimensional pitch rate, $$\hat{p} = \frac{pb}{2V}$$

$\bar{q}$=dynamic pressure, (lbf/ft^2).

$\hat{q}$=nondimensional pitch rate, $$\hat{q} = \frac{q\bar{c}}{2V}$$

$\hat{r}$=nondimensional pitch rate, $$\hat{r} = \frac{rb}{2V}$$

$R^2$=multiple correlation coefficient, $$R^2 = 1 - \frac{\sum_{j=1}^{m}(\hat{y}_j - y_j)^2}{\sum_{j=1}^{m}(\bar{y}_j - y_j)^2}$$

S=wing reference area, (ft^2).

T=maneuver length, (s).

$T_x, T_z$=body-axis components of engine thrust, (lbf).

V=true airspeed, (ft/s).

y=output to be modeled.

$\bar{y}$=mean of the output to be modeled $\hat{y}$=output estimate.

α=angle of attack, (rad or deg).

β=sideslip angle, (rad or deg).

$\delta_e, \delta_a, \delta_r$=elevator, aileron, and rudder deflections, (deg or rad).

φ,θ,ψ=Euler roll, pitch, and yaw angles, (deg or rad).

ω=angular rate.

Σ=covariance matrix

Superscripts

T=transpose

^=estimate

•=time derivative

−1=matrix inverse

Subscripts a=aileron e=elevator r=rudder cg=center of gravity o=reference value or base term Abbreviations CD-ROM=compact disk read-only memory DRAM=dynamic random-access memory DVD=digital versatile disk
EEPROM=electrically erasable programmable read-only memory
EPROM=erasable programmable read-only memory
FTP=file transfer protocol
Hp=pressure altitude, (ft)
HTTP=hypertext transfer protocol
KCAS=calibrated airspeed, (kt)
LAN=local area network
PDA=personal digital assistant
PSE=predicted squared error
RAID=redundant array of independent disks
RAM=random-access memory
RF=radio frequency
ROM=read-only memory
SSE=sum of squared errors, $SSE = \sum_{j=1}^{m}(\hat{y}_j - y_j)^2$
TCP/IP=transmission control protocol/internet protocol
VRAM=video random-access memory
WAN=wide area network

BRIEF SUMMARY OF THE INVENTION

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to a method for modeling of vehicle aerodynamics, including control inputs to the vehicle, which may be an aircraft, receiving sensor data in response to the control inputs, and selecting explanatory variables from the sensor data. The method further includes calculation of membership functions for the explanatory variables, and defining fuzzy cell internal functions to be used to determine a model output is a weighted sum of the internal functions.

In another aspect, this disclosure includes a non-transitory computer-readable storage medium comprising computer-executable instructions configured to cause the processor to receive data from sensors on a vehicle, such as an aircraft, responsive to control inputs to the aircraft. Further, the computer-executable instructions are configured to select explanatory variables from the sensor data, and generate polynomial functions using the explanatory variables. Additionally, the computer-executable instructions are configured to generate orthogonal modeling functions from the polynomial functions, and generate an output model of the aerodynamic performance of the vehicle using the orthogonal modeling functions.

In yet another aspect, this disclosure relates to a computer-implemented method for modeling vehicle aerodynamics, including control inputs to a vehicle, receiving sensor data in response to the control inputs, and selecting explanatory variables from the sensor data. Additionally, the method fits a nonlinear model to the sensor data as a function of the explanatory variables and generates an aerodynamics output using the nonlinear model.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

Development of a global aerodynamic model of a vehicle, such as for example an aircraft, using flight data gathered from a full-scale aircraft may avoid one or more issues of fidelity that may be encountered when using data derived from scaled testing in wind tunnels, or from computational methods. However, conventional full-scale flight testing may be associated with one or more additional limitations. For example, conventional full-scale flight testing may produce inadequate data due to time limitations associated with the high cost of full-scale flight testing. Advantageously, the systems and methods described herein may be utilized to more quickly develop a global aerodynamic model of an aircraft. As such, the systems and methods described herein may be utilized to develop a global aerodynamic model of an aircraft in real-time, during a test flight. Further, the increased speed at which the systems and methods described herein allow for an aerodynamic model to be developed may improve the quality of flight test data received from a test aircraft by allowing the system to identify gaps, and make adjustments to testing methodology to fill those gaps in testing data set associated with one or more maneuvers of the test aircraft.

As such, the global nonlinear aerodynamic modeling described in this disclosure may be utilized to reduce time and/or costs associated with modeling of an aircraft's aerodynamic performance. Additionally, the speed at which the global nonlinear aerodynamic modeling described herein may be carried out may offer the potential for use in real-time automated systems used to test and fly an aircraft.

Figure 1:
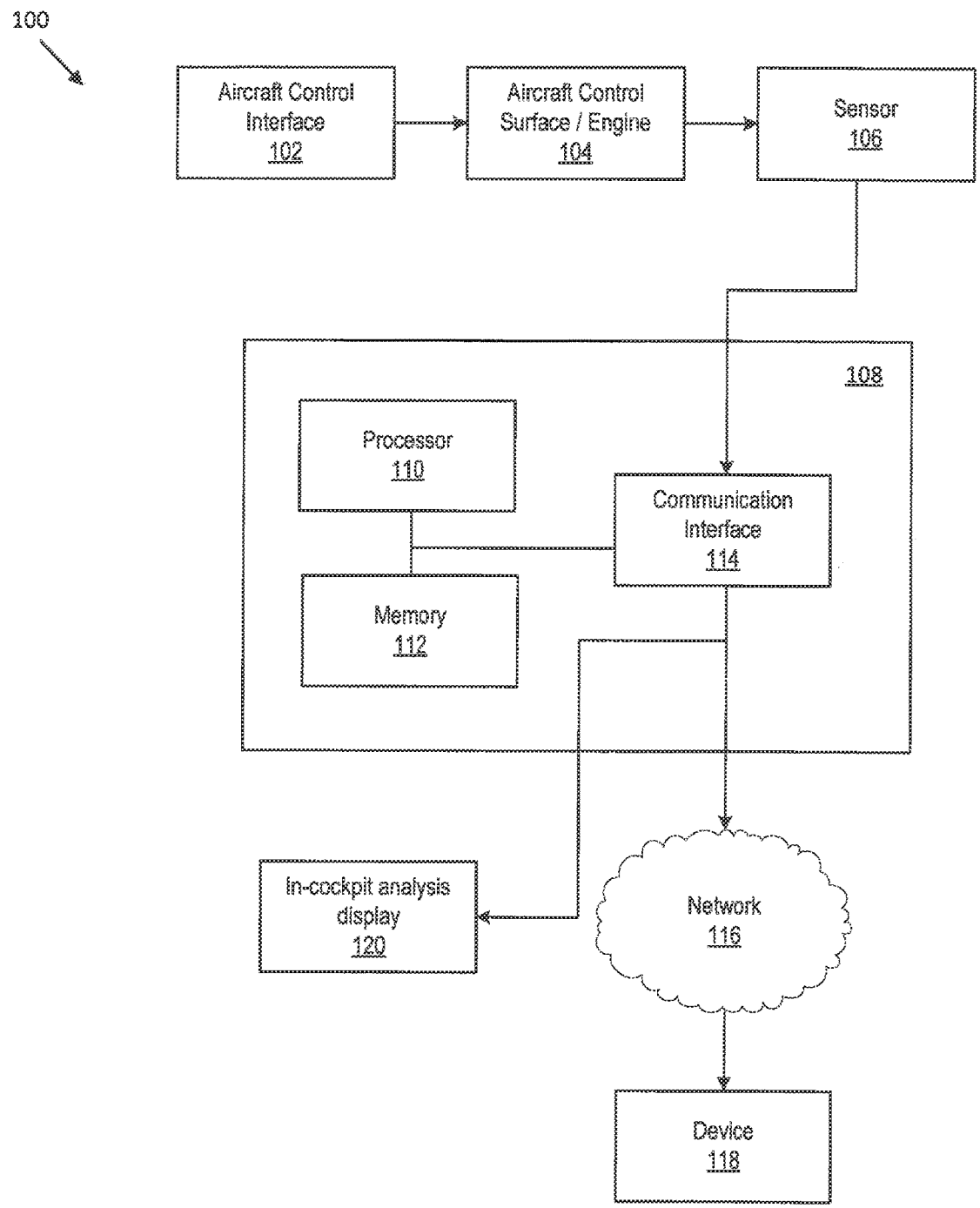
FIG. 1 schematically depicts a system that may be utilized for global, nonlinear aerodynamic modeling in which various aspects of the disclosure may be implemented.

FIG. 1 schematically depicts a system 100 that may be utilized for global, nonlinear aerodynamic modeling. Accordingly, system 100 may include an aircraft control interface 102, which may represent a manually-actuated device configured to allow a user to input control instructions/make control inputs to an aircraft. Specifically, interface 102 may comprise one or more of a wheel, a control stick, a pedal, a lever, a touch screen, a control switch/a knob, among others, and be configured to actuate one or more of a pitch, a roll, a yaw, or an engine thrust of an aircraft, among others. Accordingly, aircraft control interface 102 may utilize direct mechanical linkages between one or more manually-actuated control devices and one or more aircraft control surfaces (aileron, elevator, rotor, and the like), and/or one or more aircraft engines, schematically represented by block 104. Additionally or alternatively, the aircraft control interface 102 may utilize electronic communication (fly-by-wire) between one or more manually-actuated control devices, and one or more control surfaces and/or engines of an aircraft. Further, aircraft control interface 102 may, additionally or alternatively, receive control instructions from an automated system, such as a computer comprising preprogrammed flight instructions, and otherwise referred to as autopilot system, among others. Furthermore, those of ordinary skill in the art will recognize that control instructions/inputs may comprise inputs from a human operator (an aircraft pilot or other operator on board an aircraft) via one or more control interfaces that include, but are not limited to, throttle levers, flight sticks, and/or rudder pedals, and/or other control interfaces. In another example, control instructions may be implemented by one or more remote operators of an unmanned vehicle as signals communicated to one or more actuators of one or more flight control surfaces (ailerons, rudders, elevators, among others) of an aircraft. In yet another example, control instructions may comprise predetermined (preprogrammed) instructions communicated to one or more flight surfaces from a computer memory and/or one or more instructions generated by a computer system in response to real-time/new data received related to flight information of an aircraft. Furthermore, those of ordinary skill in the art will recognize that any method and/or devices for communicating control instructions from a computer system and/or human operator to one or more flight control surfaces may be utilized, without departing from the scope of these disclosures. For example, a control input may be via a series of mechanical linkages between a manual interface and a flight control surface, via a "fly-by-wire" system, and/or via wireless communication, among others.

In one example, system 100 may be utilized to generate a nonlinear aerodynamic model that characterizes the aerodynamic performance of the test aircraft. As such, computer system 108 may develop said aerodynamic model from sensor data received from sensor 106. Further, the sensor data output from sensor 106 may result from one or more inputs applied to interface 102. As such, in one example, the systems and methods described herein may utilize a sequence of inputs to give rise to various aircraft maneuvers. In this way, the flight conditions experienced by a test aircraft may be changed in order to fly a test aircraft over a large portion of a flight envelope, otherwise referred to as a service envelope or performance envelope of an aircraft. In one implementation, the systems and methods described herein may utilize doublet sequences, multi-step inputs, and/or fuzzy inputs, wherein a fuzzy input is a piloted quasi-random input with varying frequency and amplitude content. In one example, multi-axis fuzzy inputs may be superimposed during gradually-changing flight conditions (e.g. decelerations and accelerations), in steady turns, in spins, and through stall and post-stall flight. In one implementation, multi-axis fuzzy inputs may be piloted approximations to automated optimized multi-axis excitation inputs that may be used on subscale test aircraft. In one example, multi-axis fuzzy inputs may be applied to a large flight envelope and a full-scaled manned aircraft, and including flight conditions representing crews, maneuvering, stalls, spins, departure, and post-stall.

Flight Test Inputs

In one example, a flight test maneuver that uses a piloted fuzzy input is called a fuzzy maneuver. As such, multi-axis fuzzy inputs may be implemented while flight conditions may be varied slowly, and utilized to produce flight data, outputted by sensor 106, and utilized to develop a global aerodynamic model of the test aircraft.

Figures 2A, 2B, 2C, 2D:
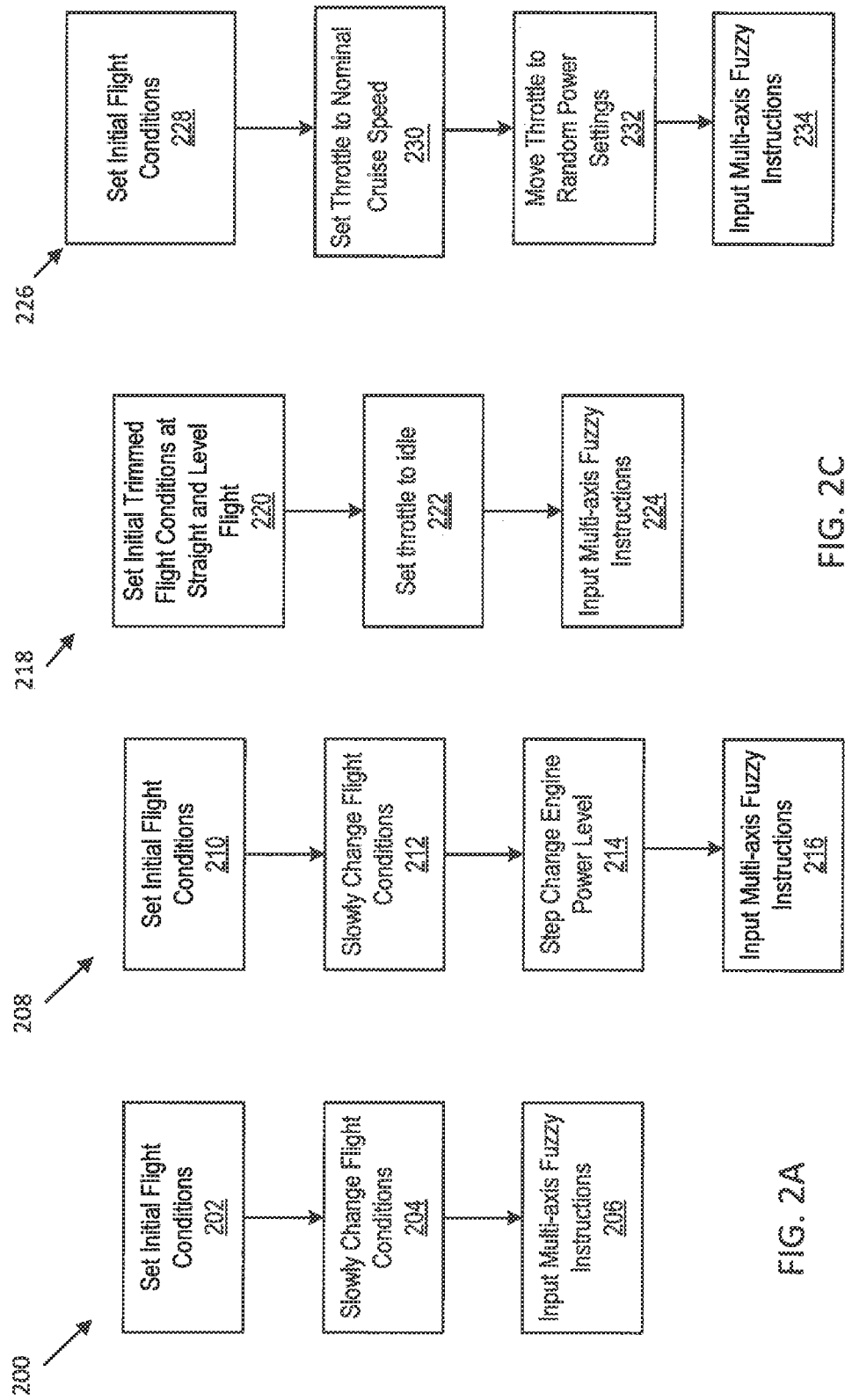
FIGS. 2A-2D schematically depict flight test input maneuvers according to one or more aspects described herein.

In one example, a piloting technique may be utilized to generate inputs to the aircraft control interface 102. As such, FIG. 2A schematically depicts one implementation of a multi-axis fuzzy maneuver 200. Accordingly, a pilot may apply control inputs to interface 102 to set initial flight conditions, such as at block 202 of maneuver 200. Further, and at block 204, a nominal flight condition may be changed slowly, e.g., low angle of attack to high angle of attack, through stall and recovery. Concurrently, and schematically depicted at block 206, the pilot may apply control inputs to excite an aircraft dynamic response using multi-axis fuzzy inputs with frequency content in a frequency band that encompasses one or more expected modal frequencies for the aircraft dynamic response. Throughout this described maneuver, piloted inputs for longitudinal stick, lateral stick, and rudder pedals may be implemented in order to move the controls in an uncorrelated manner, and while covering as much of an entire range of control surface deflections as possible for the test aircraft. Further, throughout this described maneuver, the pilot inputs to interface 102, may also vary the input frequency content. In one example, this described maneuver results in a high-efficiency global maneuver that provides multi-axis flight data, outputted from sensor 106, with high information content and low correlations among explanatory variables over a large range of flight conditions.

In another example, and as schematically depicted as maneuver process 208 from FIG. 2B, a test pilot may apply control inputs to interface 102 in order to perform an additional/alternative flight test maneuver, referred to as a powered multi-axis fuzzy deceleration maneuver 208. Accordingly, a test pilot may set initial flight conditions at block 210 of maneuver 208. Additionally, a test pilot may apply control inputs to interface 102 to change flight conditions, such as at block 212. Further, this powered multi-axis fuzzy deceleration maneuver may include occasional power level step changes made during multi-axis fuzzy maneuvers in slowly-changing flight conditions, such as a deceleration, and as schematically depicted at block 214. Concurrently, a test pilot may apply multi-axis fuzzy inputs to interface 102, such as at block 216. As such, this powered multi-axis fuzzy deceleration maneuver may provide information for jet engine thrust modeling, in addition to data information content for global aerodynamic modeling.

In one implementation, and in order to fly a fuzzy maneuver at an individual flight condition, a test pilot may initiate the maneuver from a stable trim point at straight and level flight. After a trim, the pilot may begin the fuzzy maneuver. In one example, the pilot may begin excitation of pitch, yaw, and roll axes simultaneously. Accordingly, control inputs may be varied in direction, magnitude, and frequency/speed of movement as much as possible, and while maintaining mean airplane states from trim. Further, the pilot may continuously move the control stick and rudder pedals such that different combinations of deflections and/or rates occur throughout the maneuver, while keeping the aircraft within load limits, and maintaining the mean altitude and airplane attitudes close to trim.

In one example, control inputs to the aircraft control interface 102 may be "large" or "small". As such, a "large" fuzzy maneuver may implement comparatively large control deflections, body rates, and acceleration conditions in order to explore nonlinearities that may be present for those conditions. In another example, a "small" fuzzy input may utilize comparatively smaller control amplitudes and aircraft motion. As such, a small fuzzy input may produce data for dynamic modeling approaches that identify a local or linear model at a test condition.

In one example, a pilot may execute aircraft maneuvers by applying inputs to aircraft control interface 102 until an output data set of, among others, angle of attack, sideslip, and control positions (outputted from, in one example, sensor 106), comprises a threshold amount of the possible variations of one or more of the angle of attack, sideslip, and/or control position variables.

FIG. 2C schematically depicts another flight test maneuver, referred to as a multi-axis fuzzy deceleration maneuver 218. In another example, a pilot may apply control inputs to aircraft control interface 102 in order to implement a multi-axis fuzzy deceleration maneuver. Accordingly, a multi-axis fuzzy deceleration maneuver may commence at a trimmed flight condition in straight and level flight at cruise speed allowing data to be received from low angles of attack through to a stall. As such, the pilot may set these initial trimmed flight conditions at block 220 of maneuver 218. Similar to the fuzzy maneuver at an individual flight condition, the fuzzy deceleration maneuver may be either conducted with "large" or "small" inputs, similar to the "large" and/or "small" fuzzy maneuvers described above. Upon commencing a maneuver, the throttle may be pulled to an idle thrust and the fuzzy piloted stick inputs may be initiated. As such, in one example, the throttle may be said to idle at block 222, and multi-axis fuzzy inputs applied to interface 102 at block 224. The fuzzy inputs may be similar to those used for a single flight condition; however, since the airplane, in this implementation, will be decelerating, the reference pitch attitude will be gradually increasing. Additionally, at higher speeds, structural load considerations may limit the control deflections available to the pilot. To prevent exceeding airplane limits, care must be taken to avoid excessively large control inputs until the aircraft decelerates. This constraint may result in larger control surface deflections at lower airspeeds, and also limit data acquisition of high angles of attack at high speeds (limiting Mach effect characterization). During deceleration, the pilot may execute control deflections that have random amplitude, frequency, and phasing of the three axes. This may be done continuously during the deceleration; the objective being excitation of the airplane dynamics in an uncoordinated/uncorrelated fashion throughout the maneuver. To stay close to desired conditions, the pilot may monitor altitude and remain at a selected mean altitude during the maneuver. To accelerate the rate of deceleration, the pilot may select a mean pitch-up attitude and maneuver relative to said mean pitch-up attitude. In one example, above stall angles of attack, the airplane dynamics may become larger and more unpredictable.

Returning to FIG. 2B, for a powered multi-axis fuzzy deceleration maneuver, such as process 208, when part of the maneuver is being conducted with more than idle power, the time for deceleration to stall is increased, and for level flight, increases in power can result in accelerations. Therefore, a deceleration maneuver may be modified by setting an initial pitch attitude angle reference for the maneuver.

During a powered multi-axis fuzzy deceleration maneuver, a test pilot may continuously vary the inputs while decelerating, while maintaining a mean reference attitude, and while periodically making step changes to the throttle position. The continuously-varying inputs may include amplitude, speed of control movement, and phasing of pitch, roll, and rudder inputs. Further, the maneuver may be conducted until reaching a specified speed, or continued until/beyond stall.

In another implementation, control inputs to aircraft control interface 102 may include three types of loaded fuzzy maneuvers, including fuzzy steady turns, fuzzy windup turns, and fuzzy windup/wind down turns. Additionally, flights in departed conditions such as spins and spin entries may be conducted with fuzzy maneuvering.

The maneuvers previously described are nominally conducted at 1-g. However, in order to explore Mach effects or other speed-related effects at angles of attack away from trim, maneuvers may be developed to test during higher load factors. As such, fuzzy maneuvers may be developed for both steady turn conditions, and for windup and wind down turns. A fuzzy maneuver at a steady turn may be conducted by establishing a desired condition (e.g., a level 3-g turn at 250 KCAS). This condition may be set as a trim condition, and after having been established, the fuzzy inputs may be applied. In one example, this control input strategy may be the same as the other fuzzy maneuvers previously described, except that the reference mean conditions used by the pilot may now be the initial roll and pitch attitudes, altitude, speed, and load factor. In one implementation, a target maximum and minimum load factor may be specified for the maneuver as guidance for the pilot. After the trim, the pilot may conduct the input about the mean trim conditions until sufficient data are gathered.

In one example, windup turn maneuvers may be used to obtain data at higher angles of attack and higher speeds to assess Mach or other speed related effects. The fuzzy windup turn may start with a level flight trim condition at the specified speed and altitude. The windup turn may be conducted either with the addition of power changes, or with a specified engine setting. When the maneuver is started, the mean roll angle and pitch angle is varied to maintain a constant mean airspeed while the mean load factor is increased.

To reduce pilot workload, after the trim, the pilot may roll to approximately 60 degrees bank angle and then begin the fuzzy maneuvers while increasing load factor. As the load factor is increased, pitch attitude may be lowered to use gravity to augment thrust. The maneuver may be complete when the target maximum load factor is reached, stall or heavy buffer occurs, and/or the altitude goes below a previously specified threshold, which may be a minimum threshold. The fuzzy windup/wind down turn may combine elements of both fuzzy steady turns and fuzzy windup turns. The maneuver may begin with or otherwise comprise a level flight trim condition, and/or a fuzzy windup turn. In one example, when a load factor reaches a predefined target, the speed is allowed to bleed off during the fuzzy maneuvering and attempting to maintain the target load factor as a mean value. This may increase the angle of attack and eventually reach a stall angle of attack. In one example, the airplane may be held in the stall/post stall regime as speed continues to bleed, and the end of the maneuver is similar to the fuzzy deceleration maneuvers.

In one example, a flight test maneuver may include a Spiral Powered All-axes fuZzy (SPAZ) maneuver, described as process 226 from FIG. 2D. This maneuver may include a range of angles of attack similar to a fuzzy deceleration maneuver, but also covering a large range of Mach numbers, load factors, and/or dynamic pressures during a single maneuver. In one example, process 226 may set initial conditions at block 228. Accordingly, the initial conditions may be a straight and level trim. In one implementation, a SPAZ maneuver may utilize a block of altitude. In one implementation, the maneuver may start at a nominal cruise speed at block 230, and the nose may be pitched over to obtain initial negative angles of attack. In addition to the fuzzy stick inputs described above, the throttle may be moved in steps (in one implementation these may be random steps) from nominal cruise speed to other random power settings during the maneuver, such as at block 232. Further, since the engine response may be slow relative to the other parameters being varied, best results may be obtained by setting the throttle and letting it stabilize before moving the throttle again. In one example, this may be done by selecting airspeeds to make a change (for instance change throttle every 15 knots of deceleration) or by time (e.g. every 10 seconds). Concurrently with the previously described steps for maneuver 226, the pilot may apply fuzzy inputs, such as at block 234. As such, the uncorrelated all-axes fuzzy inputs may be conducted throughout the maneuver as explained previously- and may include one or more step thrust variations. The maneuver may put the test aircraft into a descending spiral to build up Mach number and dynamic pressure. Further, a gradual increase in load factor may be implemented as the speed is increased. Subsequently, with the added load factor, the nose of the aircraft may be raised above the horizon, whereby the aircraft is decelerated. This maneuver may continue with an upward spiral to facilitate variation of load factor without going completely vertical—until stall or arrival at a condition for ending the data collection maneuver.

For fuzzy spin or spin entry maneuvers, the airplane may be trimmed at a fairly low pre-stall speed (e.g., 150 KCAS). Then, the airplane may be decelerated until near stall. At that point, large rudder and aft-stick control inputs may be made to initiate a departure. During the transient motions, the rudder and pitch inputs may be backed off slightly, and limited amplitude fuzzy control inputs may be made to provide control excitation while maintaining the mean control deflections to continue in the departure or spin without rapid recovery. This may be done for spin entry conditions in both directions, and in developed spins.

Sensor Output Data

In one example, after each maneuver, flight data may be preprocessed onboard the test vehicle to correct for sensor position errors, and to compute quantities such as dynamic pressure, true airspeed, Mach number, nondimensional angular rates, and nondimensional aerodynamic force and moment coefficients, which may be treated as the measured outputs to be modeled. After this, fuzzy logic and multivariate orthogonal function modeling techniques may be applied to develop global nonlinear aerodynamic models for the vehicle, as described below.

In one implementation, one or more nonlinear aerodynamic models of the vehicle may be developed from data output from one or more sensors, represented by block 106 of system 100. Sensor 106 may be configured to record output data associated with one or more vehicle flight characteristics, including, as described in the nomenclature section, $\alpha$, $\beta$, $a_x$, $a_y$, $a_z$, p, q, r, $\delta_e$, $\delta_a$, $\delta_r$, $\bar{q}$, calibrated airspeed, total temperature, pressure altitude, engine RPM, fuel flow rate, and throttle position. Additionally or alternatively, sensor 106 may represent air flow angle vanes installed on a vehicle, such as an aircraft configured to measure angle of attack and sideslip angle, and/or pressure sensors measuring static pressure and/or total pressure. Further, sensor 106 may comprise one or more potentiometers connected to control system push rods, and configured to measure control surface deflections. In one example, sensor 106 may comprise one or more strain gages on a pilot stick and/or rudder pedal linkages, and used to measure control forces.

In one implementation, computer system 108 may be utilized to receive sensor data from sensor 106, and process this data in order to generate one or more nonlinear aerodynamic models describing flight characteristics of the test vehicle. Accordingly, computer system 108 may be implemented as a specialized computing system. Furthermore, the computer system 108 may be implemented on consolidated computing hardware within a vehicle. In another example, the computer system 108 may be implemented across multiple computing devices within a test vehicle, or maybe partially or wholly remote to the test vehicle.

In one example implementation, the computer system 108 may comprise a processor 110 for controlling overall operation of device 108 and its associated components, including memory 112, and communication interface 114. In one example, as will be apparent to those of ordinary skill in the art, memory 112 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 112 may comprise a non-transitory computer-readable medium that may communicate instructions to processor 110 to be executed.

In one example, communication interface 114 may be configured with hardware, and supporting firmware and software, configured to communicate with one or more of a microphone, keypad, touch screen, and/or stylus through which a user of the computer system 108 may provide input. Further, communication interface 114 may be configured to communicate with one or more of a speaker for providing audio output and a video display device for providing textual, audiovisual and/or graphical output. Additionally or alternatively, communication interface 114 may be configured to facilitate network communication between the computer system 108 and another device 118, across network 116. As such, network 116 may utilize any known networking protocol including, among others, TCP/IP, Ethernet, FTP, HTTP, and comprise any computer networking methodology, including, among others, the Internet, a LAN, a WAN, Bluetooth communication, infrared communication, RF communication, optical fiber communication, a cellular network, or combinations thereof.

Additionally or alternatively, the computer system 108 and/or device 118 may also be mobile devices, such as smart phones, PDAs, and the like, which may include various other components, such as a battery, speaker, and antennas (not shown).

In one example, the communication interface 114 may be configured to output/receive information from one or more user interfaces. Accordingly, in one implementation, and in-cockpit analysis display 120 may be configured to communicate with interface 114 to display information associated with one or more modeling processes, with these modeling processes described in further detail in relation to FIGS. 2-5. In one specific example, the in-cockpit analysis display 120 may be embodied as a touch-screen interface. However, those of ordinary skill in the art will recognize that display 120 may comprise any combination of display and/or input hardware configured to output results associated with one or more modeling processes and/or receive inputs from a user in a test vehicle (pilot/other crew member of test aircraft). Furthermore, those of ordinary skill in the art will recognize that display 120 may be positioned within a test vehicle at an alternative location outside of a cockpit, without departing from the scope of these disclosures.

In one implementation, the in-cockpit analysis display 120 may be utilized to communicate real-time data to a user. This data may include one or more aerodynamic modeling results, as described in further detail in relation to FIGS. 2-5. Advantageously, the in-cockpit analysis display 120 may allow a pilot to determine whether one or more vehicle testing maneuvers performed during a test flight are sufficient for reliable aerodynamic modeling. As such, display 120 may comprise a graphical output configured to output real-time data indicating whether a number of flight test maneuvers conducted has resulted in a sufficient amount/quality/variety of data points. Additionally or alternatively, display 120 may be utilized to display one or more messages indicating one or more types of flight data still needed to form a complete data set for aerodynamic modeling. Additionally or alternatively, display 120 may output real-time modeling results such that an accuracy of a model may be determined (by computer system 108) and displayed on in-cockpit analysis display 120 during a test flight, and such that adjustments may be made to the test flight in order to improve those results displayed in real-time. As such, display 120 may be utilized to improve efficiency in one or more aerodynamic modeling processes, and such that a number of flight test hours used to develop an accurate aerodynamic model of a vehicle may be reduced due to adjustments that may be made to flight data collection procedures based upon real-time feedback from display 120.

In one implementation, the in-cockpit analysis display 120 may comprise any graphical user interface design, including one or more user input fields configured to receive control inputs (e.g. virtual buttons configured to receive touch inputs from a pilot). Further, the in-cockpit analysis display 120 may be configured to display one or more graphs of modeling results data. As such, those of ordinary skill in the art will recognize that the appearance of the display 120 may have any configuration, without departing from the scope of the disclosures described herein.

Global Aerodynamic Modeling

The one or more maneuvers previously described, such as those described in FIGS. 2A-2D may be used to develop one or more global, nonlinear aerodynamic models for the test vehicle with which the maneuvers were performed. As such, computer system 108 may be utilized to process data received from sensor 106 in order to develop one or more aerodynamic models. In one example, a nonlinear aerodynamic model valid for a majority of a normal operating range of a test vehicle may be identified from a single multi-axis fuzzy deceleration maneuver, such as maneuver 218 or 226.

Figure 3:
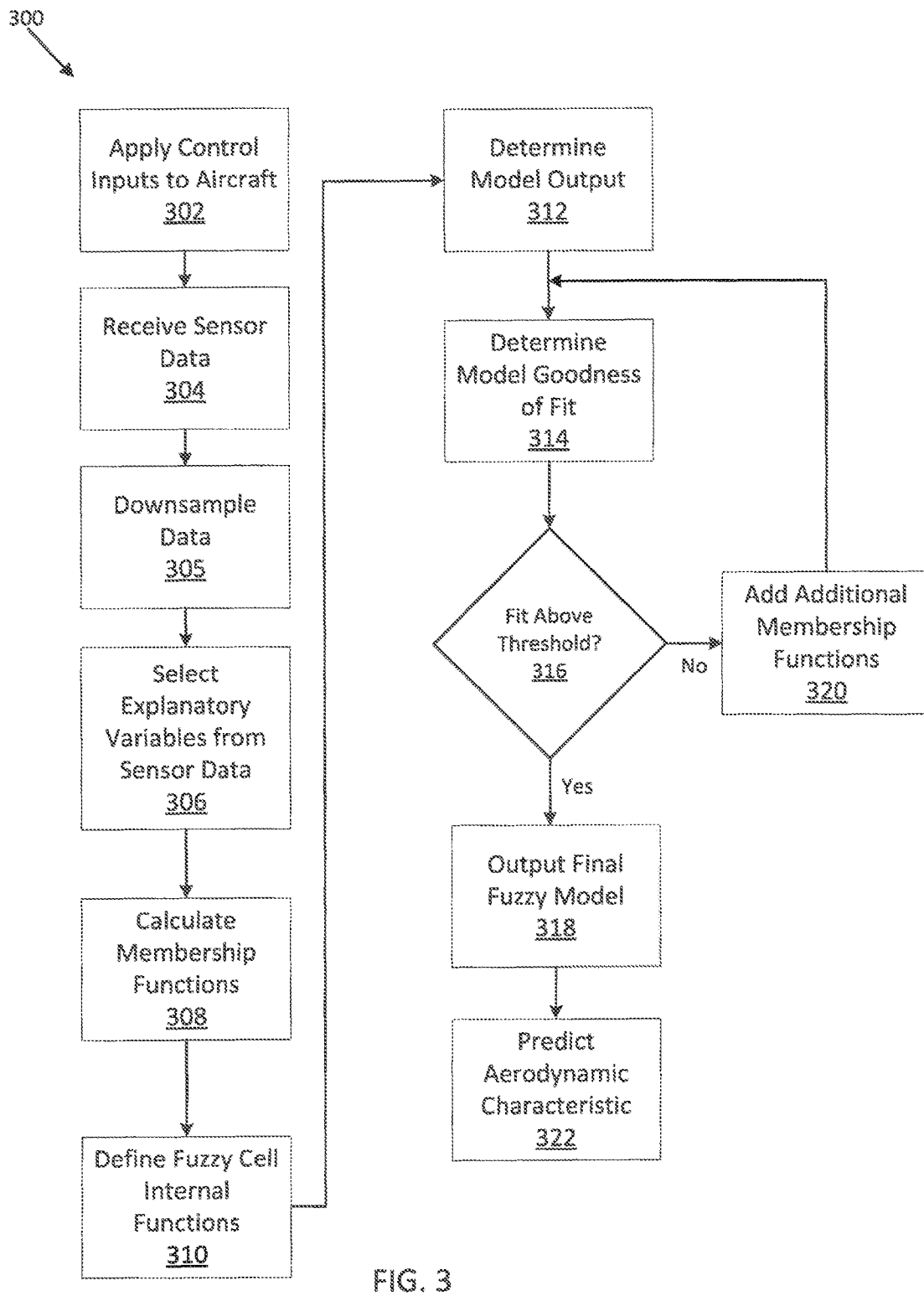
FIG. 3 schematically depicts a fuzzy logic modeling process that may be utilized in the development of a nonlinear aerodynamic model of vehicle performance according to one or more aspects described herein.

In one example, one or more processes for global aerodynamic modeling may identify a model for each nondimensional aerodynamic force and moment coefficient as a function of explanatory variables that can be measured, such as angle of attack, pitch rate, and control surface deflections, over a large range of the explanatory variables. One approach to global aerodynamic modeling, and as described in FIG. 3, is to identify a series of linear or simplified local models that individually are valid for relatively small ranges of the explanatory variables. As such, these local models are then joined together in some way to implement a global aerodynamic model. The fuzzy logic global nonlinear modeling described herein employs this type of approach, and uses fuzzy membership functions to combine linear models from multiple cells, thereby producing a global nonlinear aerodynamic model.

Figure 4:
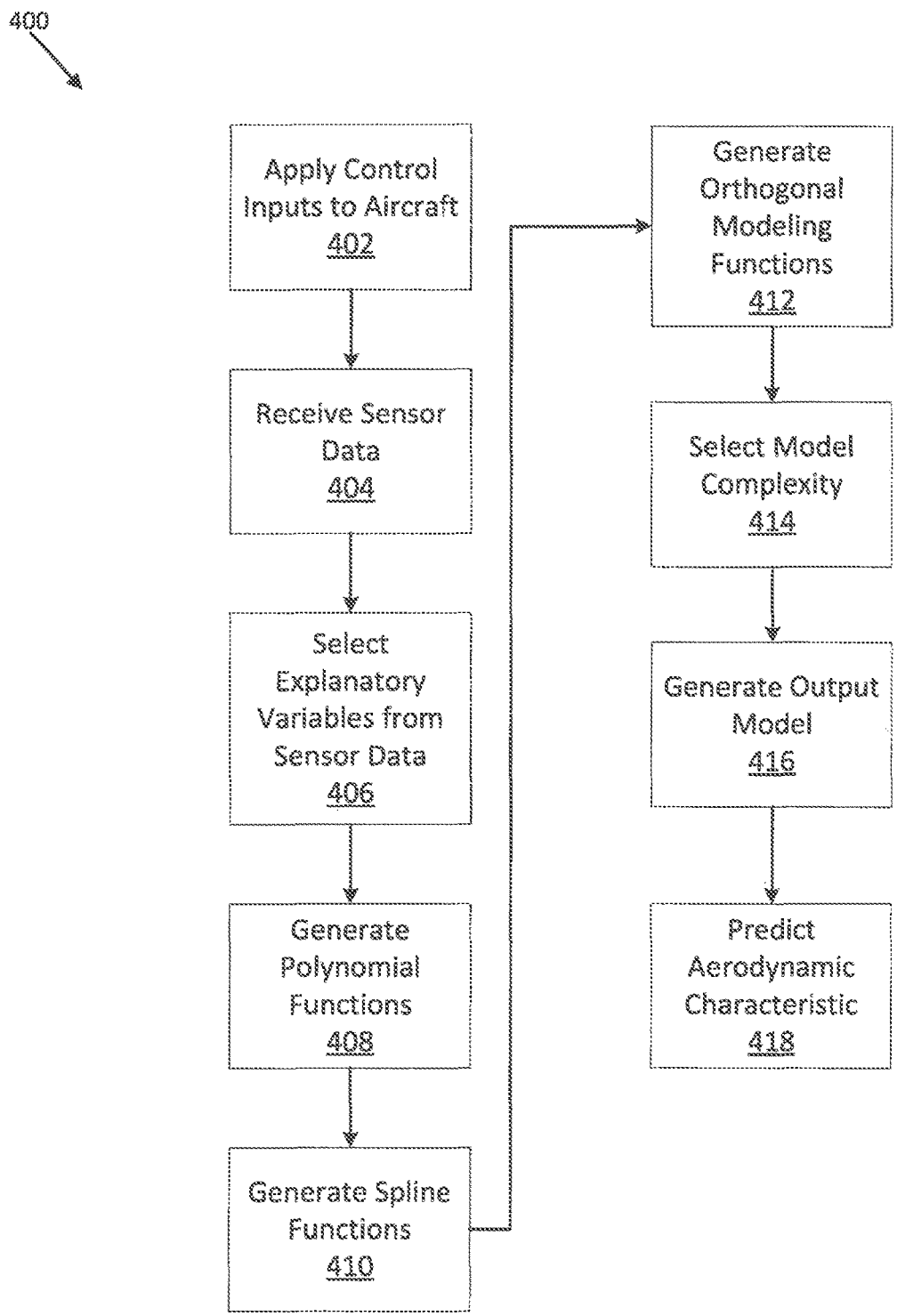
FIG. 4 schematically depicts a multivariate orthogonal function modeling process using splines according to one or more aspects described herein.

In another approach to global aerodynamic modeling, and as described in FIG. 4, nonlinear multivariate modeling functions are orthogonalized to isolate and quantify a modeling capability of each individual candidate model term, then a statistical metric is computed from the measured data, and used to select those candidate terms that should be included in the final model. The multivariate orthogonal function modeling used in this disclosure employs this approach to identify global models that are generally nonlinear and valid over large ranges of the explanatory variables.

For very large ranges of the explanatory variables, or for severe local nonlinearities, this approach, in some cases, compromises local model fitting in order to achieve a better global model fit. This may be implemented by using global orthogonal polynomial functions for modeling, which do not have the ability to change locally without modifying an entire model. As such, this problem may be remedied by including both explanatory variables and spline functions of the explanatory variables in the modeling process, which provides the required local nonlinear modeling capability, while retaining clear physical interpretation of the model and automating the selection of optimal modeling complexity necessary to accurately characterize the functional dependencies.

The following description includes two methods for global aerodynamic modeling that may be utilized in real-time onboard a test vehicle such that a model is developed while a test flight is being carried out.

In one implementation, global aerodynamic modeling of flight data may utilize nondimensional aerodynamic force and moment coefficients as response variables (otherwise referred to as dependent variables) in one or more modeling procedures. In one example, a separate modeling procedure may be carried out for each force and/or moment coefficient, such that a modeling procedure minimizes the equation error in each individual equation of motion for the six rigid-body degrees of freedom for an vehicle. In another implementation, the global aerodynamic modeling of flight data may utilize total forces and moments directly (i.e. need not use nondimensional coefficients). For example, global modeling of flight data may utilize total force in an x-direction to model one or more of aerodynamics and thrust. However, turning again to the nondimensional aerodynamic coefficients, in one example, values of the nondimensional aerodynamic force and moment coefficients may not be measured directly in flight, and may be calculated from measured and known quantities using the equations outlined below:

$$C_X \equiv -C_A = \frac{(ma_x - T_x)}{\bar{q}S} \quad (1)$$

$$C_Y = \frac{ma_y}{\bar{q}S} \quad (2)$$

$$C_Z = -C_N = \frac{ma_z}{\bar{q}S} \quad (3)$$

$$C_D = -C_X \cos\alpha - C_Z \sin\alpha \quad (4)$$

$$C_L = -C_Z \cos\alpha + C_X \sin\alpha \quad (5)$$

-continued $$C_l = \frac{I_{xx}}{\bar{q}Sb}\left[\dot{p} - \frac{I_{xz}}{I_{xx}}(pq+\dot{r}) + \frac{(I_{zz}-I_{yy})}{I_{xx}}qr\right] \quad (6)$$

$$C_m = \frac{I_{yy}}{\bar{q}S\bar{c}}\left[\dot{q} + \frac{(I_{xx}-I_{zz})}{I_{yy}}pr + \frac{I_{xz}}{I_{yy}}(p^2-r^2)\right] \quad (7)$$

$$C_n = \frac{I_{zz}}{\bar{q}Sb}\left[\dot{r} - \frac{I_{xz}}{I_{zz}}(\dot{p}-qr) + \frac{(I_{yy}-I_{xx})}{I_{zz}}pq\right] \quad (8)$$

In one implementation, equations 1-8, outlined above, retain the full rigid-body nonlinear dynamics in the vehicle equations of motion. Further, equations 1-8 result in N values of the nondimensional force and moment coefficients, where N is the number of data points for a particular maneuver or series of maneuvers. Accordingly, this data may be referred to as measured force and moment coefficient data (even though the data are not measured directly, but instead computed from other measurements and known quantities).

In one example, data for explanatory variables, such as angle of attack, sideslip angle, pitch rate, and control surface deflections, are measured directly.

In another example, the form of a global aerodynamic model may be a mathematical model structure with estimated model parameter values and associated uncertainties, and relating to the nondimensional aerodynamic force and moment coefficients to vehicle states and controls that can be measured.

Fuzzy Logic Modeling

In one implementation, and as described in relation to FIG. 3, the systems and methods described herein may utilize fuzzy logic modeling processes to develop a nonlinear aerodynamic model of vehicle performance. Accordingly, FIG. 3 schematically depicts a process 300 for fuzzy logic modeling of vehicle aerodynamics. In one example, block 302 may represent one or more processes to control inputs to an aircraft or other vehicle. As such, one or more processes executed at block 302 may apply control inputs to a vehicle control interface, such as interface 102 from FIG. 1. In turn, one or more data points may be received from sensors on a vehicle in response to those control inputs at block 302. In one example, sensor data may be received at block 304. Additionally, block 304 may represent one or more data preprocessing functions that may be carried out on data received from a sensor, such as sensor 106. Data preprocessing may include, among others, one or more processes to correct received data, compute overall forces and moments acting on the test vehicle, and/or one or more states associated with flights conditions. Specifically, data preprocessing may include air speed and altitude corrections, conversion to pressures, computational of ambient air temperature from measured total temperature, correction of angle of attack and sideslip vane data for sensor location, among others.

Fuzzy Logic Modeling—Data Downsampling

In one example, and at block 305, one or more processes may be executed to downsample (thin) data received at block 304. Accordingly, one or more processes for downsampling of data may be iterative. In one example, a determination of an approximate bandwidth resolution of a model may be made. Accordingly, an initial bandwidth assumption may be used to select appropriate values for downsampling (thinning) of the data, and to compute maximum possible modeling metrics for the measured data used for modeling. The data may be downsampled to reduce computation time. In one example, a cutoff frequency of $f_c$=2.5 Hz may be used, meaning that only responses at 2.5 Hz or lower may be considered. However, those of ordinary skill in the art will recognize that any cutoff frequency may be utilized with the processes for determination of a fuzzy model structure, without departing from the scope of the disclosures described herein. In implementation, a thinning factor TF is computed using the empirical expression, $$TF = \frac{f}{3f_c},$$

where f is a sample frequency (Hz) for the flight data received at block 304. In one example, TF is rounded down to the nearest integer value, and the data may be thinned by keeping one point for every TF point in the original array. For example, if TF=1, no thinning occurs. If TF=2, then only every other point is kept.

In one implementation, the downsampled (thinned) data arrays may be split into training and testing groups. Accordingly, the data splitting may execute one or more processes to alternate between testing and training data groups at intervals of the 3 times the period of interest, $3/f_c$ (seconds).

In one example, process 300 may include selection of one or more explanatory variables (otherwise referred to as regression variables) from received sensor data. As such, block 306 may represent one or more processes executed to select one or more explanatory variables. In this way, block 306 may represent one or more processes to select flight variables that will be used to develop a mathematical model of the vehicle aerodynamics. It is noted that no functional form of the model is needed (such as interactions between variables, etc.), but that the explanatory variables to be used in the resulting model should be specified. In one example, and as described in relation to block 305, data received from a sensor, such as sensor 106, may be partitioned into training data, and testing data. Those of ordinary skill in the art will recognize various independent variables that may be utilized as explanatory variables in the context of the disclosures described herein. As such, process 300 should not be limited to the exemplary embodiment described herein. However, in one implementation, the explanatory variable selected at block 306 may include, among others, α, β, δ, ω, M, (as described in the nomenclature).

Process 300 may also calculate membership functions. As such, in one example, block 308 may represent one or more processes to calculate one or more membership functions, wherein membership functions may be used to divide explanatory variables into various ranges. In one example, the interpretation of membership function values is as follows: where a membership function value is equal to 1, the associated explanatory variable is classified as "very important" in a given local model over an associated range of the explanatory variable. Further, for a membership function value equal to 0, the explanatory variable is classified as "not important" for a given local model over an associated range of the explanatory variable. In one example, when only one membership function is selected, it may have a constant value of 1 over an entire range of the explanatory variable. As such, with only one membership function for a selected explanatory variable, a fuzzy model is identical to a standard linear model relative to that explanatory variable. In one implementation, all inputs to a fuzzy logic modeling process may be scaled to the interval [0, 1].

In one example, process 300 may define one or more fuzzy cell internal functions. As such, fuzzy cell internal functions may be defined at block 310. In one implementation, a plurality of fuzzy cells may be utilized in process 300. As such, a fuzzy cell may comprise a linear model using explanatory variables through their associated membership functions. As such, each fuzzy cell internal function may include a combination of one membership function for each explanatory variable. In one example, an exhaustive set of all combinations of membership functions for each explanatory variable may be used to populate the fuzzy cells. These sets of internal functions may be further processed using either Newton Gradient Descent methods or linear least squares procedures that minimize the sum of squared errors. In one implementation, all the coefficients of the internal functions may be computed using the set of data partitioned for training, described in relation to block 306. Accordingly, in one example, a fuzzy cell internal function may have the form:

$$P^j = p_0^j + p_1^j x_1 + p_2^j x_2 + \ldots + p_k^j x_k \quad (9)$$

Additionally, the linear least squares procedures to minimize the sum of squared errors may have the form:

$$SSE = \sum_{j=1}^{m} (\hat{y} - y_j)^2 \quad (10)$$

Block 312 of process 300 may represent one or more processes to determine an output model. In one example, when the fuzzy cells are defined, a model output may be estimated using a weighted output of the fuzzy cells.

In one example, process 300 may determine a goodness of fit of the model output from block 312. As such, block 314 may represent one or more processes executed to calculate a goodness of fit between the model and the training data (which may be a subset of the data received at block 304). In one example, a multiple correlation coefficient, $R^2$, may be calculated to evaluate the goodness of fit of the model to the training data.

Decision block 316 may execute one or more processes to determine whether the fit of the model output from block 312 is above a threshold value. If the fit is above a threshold value, indicating a good fit, then process 300 proceeds to block 318, and the associated fuzzy model is applied to the testing data set. Those of ordinary skill in the art will recognize that this threshold value may have any value in the range of 0-1. However, if the determined goodness of fit is below a threshold value, process 300 proceeds to block 320 where additional membership functions may be added to the model output determined at block 312.

In one implementation, even if the fit of the model determined at block 312 is above a threshold value, testing may be carried out to determine whether a better fit of the data received at block 304 can be achieved by adding more membership functions. As such, additional checks may be conducted to evaluate the impact of adding one or more membership functions relative to overall predicted sum-of-square errors for the model. As such, if the added membership functions do not improve the predicted error of the model (i.e. model improvement with more terms is within the noise of the available data using the PSE and $R^2$crit criteria), and do not improve the model prediction by more than a threshold value, then process 300 may stop adding membership functions, and the model may be considered final. In one example, the evaluation executed at block 316 may utilize the following equations:

$$R_{trn}^2 > R_{minRequired}^2 \quad (11)$$

$$R_{test}^2 > R_{test}^2(Ns+1) > R_{test}^2(Ns+2) \quad (12A)$$

Additionally or alternatively, process 300 may conclude when one or more of the following four criteria are met:

Criterion 1: Training correlation coefficient is above a minimum required, and the model criteria correlation coefficient is decreasing:

$$R_{train}^2(N_s) \geq R_{min\ req}^2 \text{ and}$$

$$R_{crit}^2(N_s) \geq R_{crit}^2(N_s+1) \text{ and}$$

$$R_{crit}^2(N_s+1) \geq R_{crit}^2(N_s+2) \quad (12B)$$

Accordingly, the criteria of Equation 12B may be $R^2$ of test data, average $R^2$ of test and training data, or PSE.

Criterion 2: Training correlation coefficient is above the minimum required, and the model criteria correlation coefficient is fluctuating, but generally trending towards decreasing values.

$$R_{train}^2(N_s) \geq R_{min\ req}^2 \text{ and}$$

$$R_{crit}^2(N_s-1) > R_{crit}^2(N_s) \text{ and}$$

$$R_{crit}^2(N_s) \leq R_{crit}^2(N_s+1) \text{ and}$$

$$R_{crit}^2(N_s-1) > R_{crit}^2(N_s+1) \text{ and}$$

$$R_{crit}^2(N_s-1) > R_{crit}^2(N_s+2) \quad (12C)$$

Criterion 3: Training correlation coefficient is above the minimum required and model criteria correlation coefficient is still improving, but predicted squared error is increasing with added cells. For the current modeling, trade=1.10, which means in order to continue to add cells to the fuzzy model, the correlation coefficient improvement needs to be at least 10% if the predicted squared error increases by greater than 10%.

$$R_{train}^2(N_s) \geq R_{min\ req}^2 \text{ and}$$

$$R_{crit}^2(N_s+1) > R_{crit}^2(N_s) \text{ and}$$

$$R_{crit}^2(N_s+1) \leq trade*R_{crit}^2(N_s) \text{ and}$$

$$PSE_{train}(N_s+1) \geq PSE_{train}(N_s)/trade \text{ and}$$

$$R_{crit}^2(N_s+2) \leq trade*R_{crit}^2(N_s) \text{ and}$$

$$PSE_{train}(N_s+2) \geq PSE_{train}(N_s)/trade \quad (12D)$$

Criterion 4: The model criteria correlation coefficient does not improve after several search updates, or maximum number of search updates has been reached.

In one implementation, block 318 may output a final fuzzy model, as determined by process 300. As such, the final fuzzy model may be outputted after having reached an acceptable fit of a model output at block 312 to the training data. In particular, the final fuzzy model may be determined when the testing data $R^2$ value starts to decrease, or when adding more membership functions results in increasing predicted sum-of-square error for the model predictions. As such, the final fuzzy model includes final coefficients of all the internal functions in the fuzzy cells, and calculated using all of the data (both training and testing data) received at block 304. In particular, an output may be estimated as:

$$\hat{y}_i = \frac{1}{\sum_{j=1}^{N_{cell}} prod(A^j)} * [prod(A^1)(p_0^1 + p_1^1 x_{1,i} + p_2^1 x_{2,i} + \ldots + +p_k^1 x_{k,i}) + \quad (13)$$

-continued $$prod(A^2)(p_0^2 + p_1^2 x_{1,i} + p_2^2 x_{2,i} + \ldots + + p_k^2 x_{k,i}) + \ldots +$$

$$prod(A^{Ncell})(p_0^{Ncell} + p_1^{Ncell} x_{1,i} + p_2^{Ncell} x_{2,i} + \ldots + + p_k^{Ncell} x_{k,i})]$$

In one example, and in order to increase the speed with which a fuzzy modeling process (such as all or part of process 300) may be executed, one or more sub-processes of a fuzzy modeling process may be conducted prior to a test flight, and using data from previous flights. As such, data from one or more previous flights may be utilized to determine a number of membership functions for each explanatory variable that would likely be required to capture the global nonlinear characteristics of the vehicle aerodynamics. Accordingly, these predetermined membership function structures may be used for in-flight modeling. In one example, this methodology may not result in the most efficient model; e.g. if extra cells are retained in the model, but not needed for the modeling. However, the coefficients of those cells would be expected to be very small, and would not significantly adversely affect the results. As such, by pre-selecting a number of membership functions for each explanatory variable, the iterative loop of the process is not needed, and instead a constant overall model structure is used as more information becomes available for modeling. This may permit additional data to be used to further develop and refine the model without having to retain past data. In one example, recursive least-squares parameter estimation may be used for updating fuzzy logic models with additional flight test maneuver data.

Multivariate Orthogonal Function Modeling with Splines

In another implementation, the systems and methods described herein may utilize a multivariate orthogonal function modeling process utilizing splines, as described in relation to FIG. 4. Accordingly, in one example, process 400 may, at block 402, apply control inputs to a test vehicle. Those of ordinary skill in the art will recognize that control instructions may comprise control inputs from a human operator (an aircraft pilot or other operator on board an aircraft) via one or more control interfaces that include, but are not limited to, throttle levers, flight sticks, and/or rudder pedals, and/or other control interfaces. In another example, control instructions may be implemented by one or more remote operators of an unmanned vehicle as signals communicated to one or more actuators of one or more flight control surfaces (ailerons, rudders, elevators, among others) of an aircraft. In yet another example, control instructions may comprise predetermined (preprogrammed) instructions communicated to one or more flight surfaces from a computer memory and/or one or more instructions generated by a computer system in response to real-time/new data received related to flight information of an aircraft. Furthermore, those of ordinary skill in the art will recognize that any method and/or devices for communicating control instructions from a computer system and/or human operator to one or more flight control surfaces may be utilized, without departing from the scope of these disclosures. For example, a control input may be via a series of mechanical linkages between a manual interface and a flight control surface, via a "fly-by-wire" system, and/or via wireless communication, among others. In one implementation, block 402 may execute one or more processes to apply control inputs to a control interface, such as interface 102 from FIG. 1. In response, and at block 404, process 400 may receive sensor data from the test vehicle. As such, block 404 may represent one or more processes to receive sensor data from, among others, sensor 106.

Block 406 may execute one or more processes to select one or more explanatory variables from received sensor data. In this way, block 406 may be similar to block 306 from FIG. 3.

As such, process 400 may generate all possible polynomials in the selected explanatory variables, up to a maximum model complexity. As such, this generation of polynomial functions may be carried out at block 408. In one example, process 400 may generate polynomial splines in the explanatory variables. As such, this generation of polynomial splines may be carried out at block 410 of process 400. As such, block 410 is described in greater detail later in this disclosure. Further, these ordinary polynomials and splines may then be orthogonalized using a Gram-Schmidt numerical procedure, such that each of the resulting orthogonal functions retains only the explanatory capability that is unique to that modeling function. Accordingly, this generation of orthogonal modeling functions may be carried out at block 412. Following this data transformation, a selection of the orthogonal modeling functions that are most effective in modeling the measured data may be made, as well as a selection of a number of these orthogonal functions that should be included to identify a model that exhibits both a good fit to the measured data and good prediction capability for future data. In one example, one or more final steps to the multivariate orthogonal function modeling may include a transformation from the selected orthogonal modeling functions back to physically-meaningful polynomial functions of the explanatory variables, as well as calculation of one or more uncertainties in the associated model parameter estimates. Accordingly, various steps associated with process 400 are described in further detail in the following paragraphs.

As previously described, block 412 of process 400 may generate one or more orthogonal modeling functions. As such, multivariate orthogonal functions may be generated from ordinary multivariate functions (such as those generated at block 408) and splines (such as those generated at block 410) in the explanatory variables using a Gram-Schmidt orthogonalization procedure.

As such, block 412 may execute one or more processes to choose one of the ordinary multivariate functions, generated as polynomial functions at block 408, as a first orthogonal function. Typically, a vector of ones (associated with a bias term in the model) is chosen as the first orthogonal function, and having the form:

$$p_1 = 1 \qquad (14)$$

In general, any function of the explanatory variables may be chosen as the first orthogonal function, without any change in the procedure described herein. To generate the next orthogonal function, an ordinary multivariate function is made orthogonal to the preceding orthogonal function(s). As such, the $j^{th}$ orthogonal function, $p_j$, is defined as:

$$p_j = \xi_j - \sum_{k=1}^{j-1} \gamma_{kj} p_k \quad j = 2, 3, \ldots, n_t \qquad (15)$$

where $\xi_j$ is the $j^{th}$ ordinary multivariate function vector. For example, each $\xi_j$ may be some ordinary polynomial function of the explanatory variables, or a spline function of the explanatory variables. The $\gamma_{k_j}$ for k=1, 2 . . . j−1 are scalars determined by multiplying both sides of Equation (15) by $p_k^T$, then invoking the mutual orthogonality of the $p_k$, k=1, 2, ..., j, and solving for $\gamma_{k_j}$:

$$\gamma_{kj} = \frac{p_k^T \xi_j}{p_k^T p_k} \quad k = 1, 2, \ldots, j-1 \tag{16}$$

In one implementation, the same process may be implemented in sequence for each ordinary multivariate function $\xi_j$, j=2, 3, ..., $n_t$. In one example, the total number of ordinary multivariate functions used as raw material for generating the multivariate orthogonal functions, including a bias term, is $n_t$. As may be seen from Equations 14-16, each orthogonal function may be expressed exactly in terms of a linear expansion of the original multivariate functions. The orthogonal functions may be generated sequentially by orthogonalizing the original multivariate functions with respect to the orthogonal functions already computed. Each orthogonal function may be considered an orthogonalized version of an original multivariate function.

In one example, the multivariate orthogonal function generation methodology described here may start by generating all possible ordinary multivariate polynomials in the explanatory variables, up to a selected maximum order. For example, when modeling the nondimensional vertical force coefficient Cz, the explanatory variables may be angle of attack $\alpha$, nondimensional pitch rate $\hat{q}=q\bar{c}/2V$, and elevator deflection $\delta_e$. If the selected maximum order is 3, then the ordinary multivariate polynomial modeling functions used as the raw material for the orthogonalization process would include terms like $\alpha$, $\hat{q}$, $\delta_e$, $\alpha^2$, $\delta_e^3$, $\alpha\hat{q}^2$, $\alpha\hat{q}\delta_e$, etc. Note that considering any other candidate explanatory variables, such as sideslip angle $\beta$, may be done by simply including the sideslip angle among the group of explanatory variables. In one example, if the sideslip angle is not needed to model Cz, the model structure determination using orthogonal modeling functions will not select any orthogonal functions associated with sideslip angle. This occurs automatically in the course of the model structure determination process previously described. As such, explanatory variables that may not be important can be included, but additional computation time may be required to identify the model structure, because additional multivariate orthogonal functions will be generated and sorted.

Similarly, if a maximum order is chosen as a higher value than necessary, the only penalty would be the increased computation time necessary for generating and sorting the additional orthogonal functions. As such, the final identified model would be the same.

If the $p_j$ vectors and the $\xi_j$ vectors are arranged as columns of matrices P and X, respectively, and the $\gamma_{k_j}$ are elements in the k-th row and j-th column of an upper triangular matrix G with ones on the diagonal:

$$G = \begin{bmatrix} 1 & \gamma_{12} & \gamma_{13} & \cdots & \gamma_{1n_t} \\ 0 & 1 & \gamma_{23} & \cdots & \gamma_{2n_t} \\ 0 & 0 & 1 & \cdots & \gamma_{3n_t} \\ \vdots & \vdots & \vdots & \vdots & \vdots \\ 0 & 0 & 0 & \cdots & 1 \end{bmatrix} \tag{17}$$

Then:

$$X = PG \tag{18}$$

Which leads to:

$$P = XG^{-1} \tag{19}$$

The columns of $G^{-1}$ contain the coefficients for expansion of each column of P (i.e., each multivariate orthogonal function) in terms of an exact linear expansion in the original multivariate functions in the columns of X. Equation (19) may be used to express each multivariate orthogonal function in terms of the original multivariate functions. The manner in which the orthogonal functions are generated allows them to be decomposed without ambiguity into an expansion of the original multivariate functions, which have physical meaning.

Nonlinear Identification Using Orthogonal Modeling Functions

The form of a multivariate orthogonal function model may be:

$$z = a_1 p_1 + a_2 p_2 + \ldots a_n p_n + \varepsilon \tag{20}$$

where z is an N-dimensional vector of the response variable (e.g., nondimensional force or moment coefficient), $z=[z_1, z_2, \ldots, z_N]^T$, modeled in terms of a linear combination of n mutually orthogonal modeling functions $p_j$, j=1, 2, ..., n. Each $p_j$ is an N-dimensional vector that in general depends on the explanatory variables. The $a_j$, j=1, 2, ..., n are constant model parameters to be determined, and E denotes the modeling error vector.

In one implementation, Equation (20) may represent a mathematical model used to represent functional dependencies in the measured data.

Define an N×n matrix P:

$$P = [p_1, p_2, \ldots, p_n] \tag{21}$$

Let $a=[a_1, a_2, \ldots, a_N]^T$. Accordingly, equation 20 can be written as a standard least-squares regression problem:

$$z = Pa + \varepsilon \tag{22}$$

The error, $\varepsilon$, is to be minimized in a least-squares sense. The goal is to determine a value for a that minimizes the least-squares cost function:

$$J = \frac{1}{2}(z - P\hat{a})^T(z - P\hat{a}) = 1/2 \varepsilon^T \varepsilon \tag{23}$$

The parameter vector estimate $\hat{a}$ that minimizes this cost function is computed as:

$$\hat{a} = [P^T P] P^T z \tag{24}$$

The estimated parameter covariance matrix is:

$$\Sigma_{\hat{a}} = E[(\hat{a} - a)(\hat{a} - a)^T] = \sigma^2 (P^T P)^{-1} \tag{25}$$

where E is the expectation operator, and the fit error variance $\sigma^2$ can be estimated from the residuals:

$$v = z - P\hat{a} \tag{26}$$

using:

$$\hat{\sigma}^2 = \frac{1}{(N-n)}[(z - P\hat{a})^T(z - P\hat{a})] = \frac{v^T v}{(N-n)} \tag{27}$$

Parameter standard errors are computed as the square root of the diagonal elements of the $\Sigma_{\hat{a}}$ matrix from equation 25, using $\hat{\sigma}^2$ from equation 27. The identified model output, y, is computed as:

$$y = P\hat{a} \tag{28}$$

In conventional least-squares modeling, the modeling functions (columns of P) are often polynomials in the explanatory variables. This approach corresponds to using the terms of a multivariate Taylor series expansion to approximate the functional dependence of the response variable on the explanatory variables. If the modeling functions are instead multivariate orthogonal functions generated from the explanatory variable data, it is easier to determine an appropriate model structure, because the explanatory capability of each modeling function is completely distinct from all the others. This decouples the least-squares modeling problem, as will be shown below.

For mutually orthogonal modeling functions:

$$p_i^T p_j = 0, \; i \neq j, \; i,j = 1, 2, \ldots n \tag{29}$$

and $P^T P$ is a diagonal matrix with the inner product of the orthogonal functions on the main diagonal. Using equations 21 and 29 in equation 24, the j-th element of the estimated parameter vector $\hat{a}$ is given by:

$$\hat{a}_j = (p_j^T z)/(p_j^T p_j) \tag{30}$$

Using equations 21, 29, and 30 in equation 23:

$$J(\hat{a}) = \frac{1}{2}\left[z^T z - \sum_{j=1}^{n} (p_j^T z)^2 / (p_j^T p_j)\right] \tag{31}$$

Equation (31) shows that when the modeling functions are orthogonal, the reduction in the least squares cost function resulting from including the term $a_j p_j$ in the model depends only on the response variable z and the added orthogonal modeling function $p_j$. The least-squares modeling problem is therefore decoupled, which means that each orthogonal modeling function may be evaluated independently in terms of its ability to reduce the least-squares model fit to the data, regardless of which other orthogonal modeling functions are already selected for the model. When modeling functions $p_j$ are instead polynomials in the explanatory variables (or any other non-orthogonal function), the least-squares problem is coupled, and iterative analysis is required to find a subset of modeling functions for an adequate model structure.

The orthogonal modeling functions to be included in the model are chosen to minimize predicted squared error, PSE, defined by:

$$PSE = \frac{(z - P\hat{a})^T(z - P\hat{a})}{N} + \sigma_{max}^2 \frac{n}{N} \tag{32}$$

or by:

$$PSE = \frac{2J}{N} + \sigma_{max}^2 \frac{n}{N} \tag{33}$$

The constant $\sigma_{max}^2$ is the upper-bound estimate of the squared error between future data and the model, i.e., the upper-bound mean squared error for prediction cases. The upper bound is used in the model over-fit penalty term to account for the fact that PSE is calculated when the model structure is not correct, i.e., during the model structure determination stage. Using the upper bound is conservative in the sense that model complexity will be minimized as a result of using an upper bound for this constant in the penalty term. Because of this, the value of PSE computed from equation 33 for a particular model structure tends to overestimate actual prediction errors on new data. Therefore, the PSE metric conservatively estimates the squared error for prediction cases.

A simple estimate of $\sigma_{max}^2$ that is independent of the model structure can be obtained by considering $\sigma_{max}^2$ to be the residual variance estimate for a constant model equal to the mean of the measured response values:

$$\sigma_{max}^2 = \frac{1}{N-1}\sum_{i=1}^{N}[z_i - \bar{z}]^2 \tag{34}$$

where:

$$\bar{z} = \frac{1}{N}\sum_{i=1}^{N} z_i \tag{35}$$

The PSE in Equation 33 depends on the mean squared fit error, $2\hat{J}/N$ and a term proportional to the number of terms in the model, n. The latter term prevents over-fitting the data with too many model terms, which is detrimental to model prediction accuracy. While the mean squared fit error $2\hat{J}/N$ must decrease with the addition of each orthogonal modeling function to the model (by equation 31), the over-fit penalty term $\sigma_{max}^2 n/N$ must increase with each added model term (n increases). Introducing the orthogonal modeling functions into the model in order of most effective to least effective in reducing the mean squared fit error (quantified by $(p_j^T z)^2/(p_j^T p_j)$ for the j-th orthogonal modeling function) means that the PSE metric will always have a single global minimum. Using orthogonal functions to model the response variable makes it possible to evaluate the merits of including each modeling function individually, using the predicted squared error PSE. The goal is to select a model structure with minimum PSE, and the PSE always has a single global minimum for orthogonal modeling functions. This makes the model structure determination a well-defined and straightforward process that can be automated.

Conversion to Physically-Meaningful Multivariate Function Models

After the model structure is determined using multivariate orthogonal modeling functions for minimum PSE, the identified model output, as described in relation to block 416, is given by:

$$y = P\hat{a} \tag{36}$$

where the P matrix now includes only the n orthogonal functions selected in the model structure determination, $n \leq n_t$. Each retained orthogonal modeling function can be decomposed without error into an expansion of the original multivariate functions in the explanatory variables, using the columns of $G^{-1}$ in equation 19 corresponding to the retained orthogonal functions. Common terms are combined using double precision arithmetic to arrive at a model using only original multivariate functions in the explanatory variables. Terms that contribute less than 0.1% of the final model roofs-mean-squared magnitude are dropped.

The final form of the model is a sum of ordinary multivariate functions in the explanatory variables, with associated model parameter estimates.

Including Spline Functions in the Orthogonalization

Referring back to block 410, in one example, process 400 may generate one or more spline functions. Accordingly, for global aerodynamic modeling, functional dependencies of the aerodynamic coefficients on the explanatory variables can exhibit significant localized variation. In these cases, a global polynomial model may be inadequate for capturing those local variations. In one example, spline functions in the explanatory variables may be introduced as additional pseudo-explanatory variables. Accordingly, splines may have local modeling capability that global polynomial modeling functions do not have, because splines are polynomials defined only on selected intervals. Low-order polynomial terms defined on limited intervals can approximate nonlinearities quite well. Using polynomial splines also retains clear physical interpretation in the final model.

Spline functions may be defined as piecewise polynomial functions of degree m in one or more explanatory variables. The term "piecewise" means that the polynomial is different for specific ranges of the explanatory variables. Spline function values and derivatives agree at the points where the piecewise polynomials join. These points are called knots, and are defined as specific values of each explanatory variable. A polynomial spline, $S_m(x)$ of degree m with continuous derivatives up to degree m−1, for single explanatory variable $x \in [x_0, x_{max}]$ can be expressed as:

$$S_m(x) = \sum_{i=1}^{k} D_i (x - x_i)_+^m \quad (37)$$

where:

$$(x - x_i)_+^m = \begin{cases} (x - x_i)^m & x > x_i \\ 0 & x \leq x_i \end{cases} \quad (38)$$

and the $C_r$ and $D_i$ are constants and $(x-x_i)_+^m$ are the piecewise parts of the spline function. The values $x_1, x_2, \ldots, x_k$ are knots which satisfy the condition:

$$x_0 < x_1 < x_2 < \ldots < x_k < x_{max} \quad (39)$$

Note that when the spline knots are the same, then a higher-order piecewise spline in a single explanatory variable can be computed as multiplication of lower-order piecewise splines in the same explanatory variable:

$$(x-x_i)_+^m = (x-x_i)_+^{m-1}(x-x_i)_+^1 \quad m \geq 1 \quad (40)$$

In one example, a nondimensional vertical aerodynamic force coefficient $C_z$ may be modeled with explanatory variables: angle of attack $\alpha$, and elevator control deflection $\delta_e$. For a maximum selected model order of 2, the ordinary polynomial modeling functions that will serve as raw material for the orthogonalization process are:

$$1, \alpha, \alpha^2, \alpha\delta_e, \delta_e, \delta_e^2 \quad (41)$$

which would lead to a final multivariate polynomial model of the form:

$$C_Z = C_{Z_o} + C_{Z_\alpha}\alpha + C_{Z_{\alpha^2}}\alpha^2 + C_{Z_{\alpha\delta_e}}\alpha\delta_e + C_{Z_{\delta_e}}\delta_e + C_{Z_{\delta_e^2}}\delta_e^2 \quad (42)$$

where the values of the model parameters such as $C_{Z_o}$ and $C_{Z_\alpha}$ would be estimated from the data using the orthogonal function modeling and subsequent decomposition procedures described earlier, and some of the terms might not be present, depending on the results of the model structure determination using orthogonal functions. This represents a global polynomial model.

Subsequently, a first-order spline term may be introduced in angle of attack with a single knot located at 10 deg. Using the same maximum model order 2, the set of ordinary polynomial modeling functions expands to:

$$1, \alpha, \alpha^2, \alpha\delta_e, \delta_e, \delta_e^2, (\alpha-10)_+^1, \alpha(\alpha-10)_+^1, \delta_e(\alpha-10)_+^1, (\alpha-10)_+^2 \quad (43)$$

In one example, block 414 of process 400 may execute one or more sub-processes to select a model complexity to be applied to an output model. As such, Equation 44 below may represent a final multivariate polynomial model of the form having a model complexity selected at block 414, and output as an identified model at block 416:

$$C_Z = C_{Z_o} + C_{Z_\alpha}\alpha + C_{Z_{\alpha^2}}\alpha^2 + \\ C_{Z_{\alpha\delta_e}}\alpha\delta_e + C_{Z_{\delta_e}}\delta_e + C_{Z_{\delta_e^2}}\delta_e^2 + C_{Z_{\alpha_{10}^1}}(\alpha-10)_+^1 + \\ C_{Z_{\alpha\alpha_{10}^1}}\alpha(\alpha-10)_+^1 + C_{Z_{\delta_e\alpha_{10}^1}}\delta_e(\alpha-10)_+^1 + C_{Z_{\alpha_{10}^2}}(\alpha-10)_+^2 \quad (44)$$

In one implementation, a Bayesian approach may be used for updating multivariate orthogonal function models based on additional flight test maneuver data.

Model Testing Results

In one implementation, the models developed by processes 300 and 400 may be utilized to predict one or more aerodynamic performance characteristics of a test vehicle. As such, in one example, process 300 may predict an aerodynamic characteristic at block 322. In another example, process 400 may utilize an output model, generated at block 416, to predict an aerodynamic characteristic of a test vehicle, such as at block 418.

Advantageously, the systems and methods described in FIGS. 3 and 4 may be utilized to effectively produce nonlinear global aerodynamic models from flight test data. As such, the systems and methods described herein may be utilized to produce accurate aerodynamic models in real-time while a test vehicle is in flight. In this way, the systems and methods described herein may allow for improved speed, and reduced cost, of development of aerodynamic models.

As such, Table 1 below presents a summary of modeling results. In particular, Table 1 outlines fit quality results for a fuzzy model, as described in relation to FIG. 3, for 6 components of aerodynamics:

TABLE 1

(Fit Quality Results for Fuzzy Model)

| Coefficient | Correlation Coefficient, $R^2$ | Explanatory Variables |
|---|---|---|
| Cx | 0.983 | $\alpha, \beta, \delta_e, \delta_a, \delta_r, \dot{\alpha}, \dot{p}, \dot{q}, \dot{r}$ |
| Cy | 0.967 | $\alpha, \beta, \delta_e, \delta_a, \delta_r, \dot{\beta}, \dot{p}, \dot{q}, \dot{r}$ |
| Cz | 0.997 | $\alpha, \beta, \delta_e, \delta_a, \delta_r, \dot{\alpha}, \dot{p}, \dot{q}, \dot{r}$ |
| Cl | 0.950 | $\alpha, \beta, \delta_e, \delta_a, \delta_r, \dot{\beta}, \dot{p}, \dot{q}, \dot{r}$ |
| Cm | 0.971 | $\alpha, \beta, \delta_e, \delta_a, \delta_r, \dot{\alpha}, \dot{p}, \dot{q}, \dot{r}$ |
| Cn | 0.964 | $\alpha, \beta, \delta_e, \delta_a, \delta_r, \dot{\beta}, \dot{p}, \dot{q}, \dot{r}$ |

Figure 5:
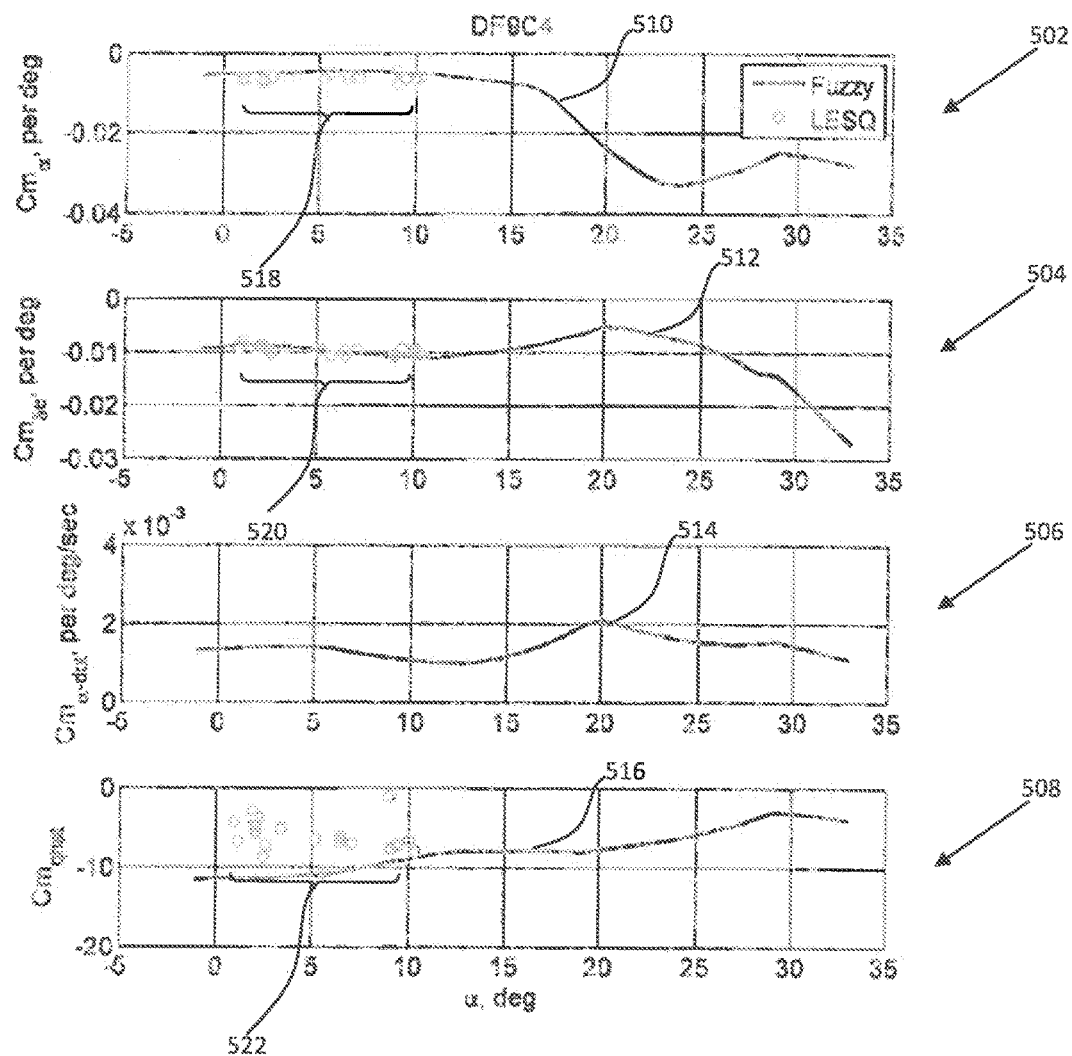
FIG. 5 depicts linearized fuzzy model results from one maneuver compared with traditional results.

FIG. 5 depicts linearized fuzzy model results from one maneuver compared with traditional results. In particular, FIG. 5 depicts four plots 502-508, of a nondimensional aerodynamic moment coefficients versus angle of attack. As such, plots 502-508 compare results from flight test data obtained using doublet inputs using a least-squares equation error modeling method, referred to as "traditional" methodology, with that of fuzzy modeling methodology. Accordingly, the fuzzy model is plotted as graphs 510-516, and the data used to generate the graphs 510-516 was obtained from one maneuver during one flight, and using those explanatory variables listed above in Table 1. Further, the doublet data were obtained from 20 maneuvers over six different data flights, and plotted as data point groups 518-522. As such, FIG. 5 illustrates that flight testing methodology using fuzzy inputs (graphs 510-516) provides high information content in a highly efficient manner (using fewer maneuvers and/or test flights). Additionally, the conventional results, represented as data point groups 518-522, do not give modeling results for angles of attack above a stall angle (circa $\alpha=12°$) due to constraints of the employed method. In comparison, and advantageously, the fuzzy model methodology, graphed as graphs 510-516, models results through the stall angle and departed regions of flight.

Further, upon comparison of the results shown in FIG. 5, it is apparent that there exists good correlation of static terms from the two different methods (fuzzy model and doublet input methods). Additionally, the doublet data shows more scatter for dynamic derivatives and less damping predicted.

Those of ordinary skill in the art will recognize that the systems and methods described herein may be utilized with various vehicle types, without departing from the scope of the disclosures described herein. In one implementation, one or more of the described systems and methods may be utilized to produce an aerodynamic model of a piloted airplane. In another example, the systems and methods may be utilized to model aerodynamic behavior of a helicopter, an unmanned aerial vehicle (otherwise referred to as a drone), or any other aircraft type. In yet another implementation, one or more of the systems and methods described herein may be generally applied to any vehicle type, including a vehicle configured to traverse a surface (land-based vehicle), a vehicle configured to operate in water (a boat, and the like), or a vehicle configured for operation in orbit around Earth, or in outer space (a spacecraft, and the like).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, smart phones, tablet computers, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that the invention is not to be limited to the embodiments disclosed herein, but is to be understood from the following claims, which are to be interpreted as broadly as allowed under the law.

What is claimed is:

1. A method of in-flight production of an aerodynamic model of an aircraft, comprising:
   receiving an indication of control inputs at a full-scale aircraft during a test flight;
   responsive to the control inputs, obtaining sensor data from one or more sensors on the aircraft during the test flight;
   downsampling the sensor data received from the test flight based at least in part on a cutoff frequency to reduce a computation time of the aerodynamic model;
   selecting, in flight, one or more explanatory variables from the downsampled sensor data;
   calculating in-flight, one or more membership functions for each of the one or more explanatory variables;
   defining a plurality of fuzzy cell internal functions, wherein a fuzzy cell internal function from the plurality of fuzzy cell internal functions comprises a membership function from the one or more membership functions for each of the one or more explanatory variables from the downsampled sensor data;
   determining a model output in the time domain of the aerodynamic performance of the aircraft as a weighted output of the plurality of fuzzy cell internal functions, wherein the model output is non-linear and is determined in real-time while the aircraft is airborne and the model output corresponds to all six-rigid body degrees of freedom of the aircraft;
   predicting, in-flight, an aerodynamic performance characteristic of the aircraft using the model output; and
   using the model output to impact one or more aircraft maneuvers;
   wherein the maneuvers change the flight conditions of the aircraft.

2. The method of claim 1, further comprising:
   determining a goodness of fit of the model output to the obtained sensor data;
   wherein if the goodness of fit is above a threshold value, outputting a final fuzzy model; and
   wherein if the goodness of fit is below a threshold value, calculating one or more additional membership functions to be added to the model output.

3. The method of claim 1, wherein the one or more explanatory variables comprise one or more of an angle of attack, a pitch rate and a control surface deflection of the aircraft.

4. The method of claim 1, wherein the model output is a global aerodynamics model comprising one or more nondimensional aerodynamic force and moment coefficients as a function of the one or more explanatory variables.

5. The method of claim 1, wherein the control inputs comprise one or more fuzzy inputs.

6. The method of claim 5, wherein a fuzzy input, from the one or more fuzzy inputs, comprises a quasi-random input with varying frequency content and amplitudes.

7. The method of claim 1, wherein obtaining sensor data further includes preprocessing of the sensor data, while in-flight after an aircraft maneuver, to determine overall forces and moments acting on the aircraft.

8. The method of claim 1, wherein the calculating one or more membership functions for each of the one or more explanatory variables is carried out prior to the test flight.

9. The method of claim 1, wherein the control inputs alter one or more of a pitch, a roll, a yaw, or an engine thrust of the aircraft.

10. The method of claim 9, wherein the alteration is effected by the control inputs actuating mechanical linkages between one or more of the group consisting of manually-actuated control devices, aircraft control surfaces, and aircraft engines, wherein the control surfaces are selected from the group consisting of aileron, elevator, and rotor.

11. The method of claim 9, wherein the alteration is effected by the control inputs using electronic communication between one or more of the group consisting of manually-actuated control devices, aircraft control surfaces, and aircraft engines, wherein the control surfaces are selected from the group consisting of aileron, elevator, and rotor.

12. A non-transitory computer-readable storage medium comprising computer-executable instructions that when executed by a processor are configured to cause a processor to perform, in-flight during a test flight of an aircraft, at least:
   receive, responsive to control inputs to the aircraft, sensor data from one or more sensors on the aircraft;
   select one or more explanatory variables from the sensor data;
   generate a plurality of multivariate functions using the one or more explanatory variables;
   generate a plurality of orthogonal modeling functions from the plurality of multivariate functions;

generate an output model comprising one or more of the plurality of orthogonal modeling functions that minimize a predicted square error;
wherein the output model is nonlinear and is determined in real-time while the aircraft is airborne;
predict in-flight, a flight characteristic of the aircraft using the output model;
use the output model to impact one or more aircraft maneuvers in a subsequent portion of the test flight, wherein the maneuvers change the flight conditions of the aircraft; and
update, in flight, the plurality of orthogonal modeling functions based on sensor data from the subsequent portion of the test flight with a Bayesian approach.

13. The non-transitory computer-readable storage medium of claim 12, wherein the computer-executable instructions are further configured to:
generate one or more spline functions to be added to the output model.

14. The non-transitory computer-readable storage medium of claim 12, wherein the computer-executable instructions are further configured to:
select a model complexity of the output model to be used to describe an aerodynamic behavior of the aircraft;
wherein the plurality of multivariate functions have a maximum degree of complexity equal to a complexity of the selected model.

15. The non-transitory computer-readable storage medium of claim 12, wherein the generating a plurality of orthogonal modeling functions further comprises using a Gram-Schmidt orthogonalization procedure on the plurality of multivariate functions.

16. The non-transitory computer-readable storage medium of claim 12, wherein the output model is a global aerodynamic model of the aircraft comprising one or more nondimensional aerodynamic force and moment coefficients as a function of the one or more explanatory variables.

17. The non-transitory computer-readable storage medium of claim 12, wherein the computer-executable instructions are further configured to:
transmit, in-flight, the predicted flight characteristic of the aircraft to at least one of an audio output and a display device, such that the flight characteristic associated with the modeling results is available to a user in real time as one or more of an audio output and a graphical output; and
receive, in-flight, one or more control inputs from the user in response to the transmitted one or more of the audio output and the graphical output, the one or more control inputs impacting the one or more aircraft maneuvers.

18. A computer-implemented method for in-flight production of an aerodynamic model of an aircraft, comprising:
applying control inputs to the aircraft during a test flight;
receiving, responsive to the applied control inputs, sensor data from one or more sensors on the aircraft;
selecting one or more explanatory variables from the sensor data;
fitting a nonlinear model to the received sensor data as a function of the selected one or more explanatory variables;
generating an aerodynamics output model comprising the fitted nonlinear model;
wherein the output model is generated in real-time while the aircraft is airborne;
displaying, in-flight, the fitted nonlinear model on a display device, such that the fitted nonlinear model associated with the output model is available to a user in real time;
determining, in flight, at least one adjustment to the test flight to improve the fitted nonlinear model, wherein the at least one adjustment is a change to one or more aircraft maneuvers in a subsequent portion of the test flight; and
displaying, in flight, a message indicating the at least one adjustment.

19. The computer-implemented method of claim 18, further comprising:
determining a goodness of fit of the nonlinear model to the received sensor data;
wherein if the goodness of fit is above a threshold value, generating the aerodynamics output model; and
wherein if the goodness of fit is below a threshold value, adjusting the nonlinear model.

20. The computer-implemented method of claim 18, wherein the one or more explanatory variables comprise one or more of an angle of attack, a pitch rate and a control surface deflection of the aircraft.

* * * * *